March 31, 1931.  A. HEBNER  1,798,939
TIRE CARRIER
Filed Dec. 6, 1928

Inventor
Arthur Hebner
By Blackmore, Spencer & Hick
Attorneys

Patented Mar. 31, 1931

1,798,939

UNITED STATES PATENT OFFICE

ARTHUR HEBNER, OF PONTIAC, MICHIGAN, ASSIGNOR TO GENERAL MOTORS CORPORATION, OF DETROIT, MICHIGAN, A CORPORATION OF DELAWARE

TIRE CARRIER

Application filed December 6, 1928. Serial No. 324,202.

This invention relates to improvements in spare tire carriers for motor vehicles and the like and is particularly adapted for use on trucks and commercial vehicles.

It is an object of the invention to provide a strong and rugged tire carrier of simple and inexpensive construction, and which consists of a supporting platform suspended beneath the chassis frame at the rear of the vehicle where the extra tire, carried in a substantially horizontal position, will be out of the way and yet accessible and easy to get at for removal and remounting.

Another object of the invention is to provide a carrier which will accommodate different sizes of tires, so that the truck manufacturer may employ the same carrier throughout his line regardless of variations in tire sizes as used on his several types of vehicles.

A further and important object of the invention is to provide an improved means for firmly clamping any one of the standard sizes of tires on the supporting platform, and which clamping means is so arranged as to be movable out of the way when the tire is being mounted on or removed from the carrier, so as to facilitate and make easy the manipulation of the spare tire.

A still further object of the invention is to provide a spare tire carrier wherein a strap or bar serves the double purpose of both a part of the tire clamping means and a tool when the tire casing is to be demounted or replaced on the rim.

Other objects and advantages will become apparent from the following specification when taken in connection with the accompanying drawing wherein.

Figure 1:
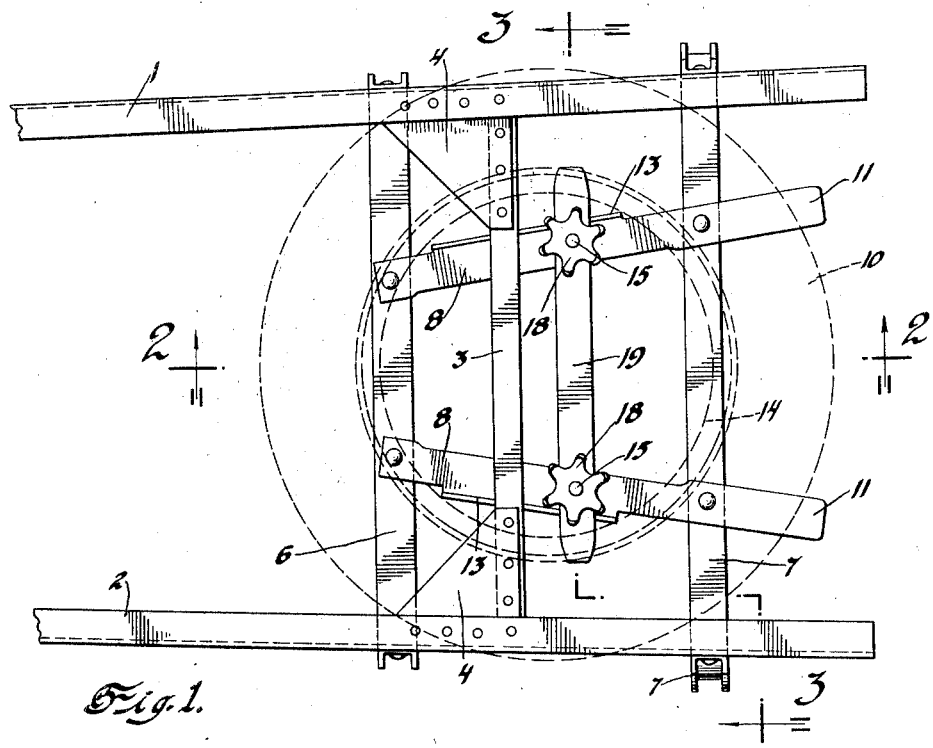
Fig. 1 is a top plan view of a rear portion of the chassis frame having suspended therebeneath a platform embodying the present invention.

Referring to the drawing the numerals 1 and 2 indicate a pair of longitudinally extending channel-shaped members of a vehicle chassis frame and 3 is a transverse frame member connected at its ends through gusset plates 4 to the side frame members 1 and 2. Beneath the chassis frame are a pair of channel bars 6 and 7 of U-shape, spaced one beyond the other, and having their upwardly extending arms riveted, bolted or otherwise secured to the chassis frame members 1 and 2. Resting upon and secured to the U-shaped members 6 and 7 are a pair of straps or bars 8—8 which brace the members 6 and 7 from each other and form therewith the supporting platform on which the tire casing indicated at 10 is to be placed. The rear ends of the bars 8 extend beyond the rearmost U-shaped member 7 and are preferably curved downwardly as at 11 to facilitate the sliding of the tire on to and off of the platform. One edge of each bar 8 is flanged downwardly as at 12 for reinforcement purposes, and the other edge is provided with an upstanding flange 13 for engagement with the inside of the tire carrying rim 14 to center or locate the tire upon the platform.

Extending upwardly through the central space within the tire are a pair of bolts or studs 15, each of which extends through an aperture or opening in one of the bars 8, and has its lower end bent over to form an angled foot 17 for engagement with the underside of the bar when the hand nut 18 threaded on the upper end of the stud 15 is drawn down against the cross bar or strap 19 that engages at opposite ends with the upper side of the tire rim 14 to firmly clamp the tire down on the platform. A nut 20 is threaded on each bolt 15 and affords a stop for the cross bar 19 in the event the vehicle is operated at a time when there is no spare tire mounted in the carrier. Different sizes of tires will, of course, be of different transverse widths and it will be obvious that the carrying of larger or smaller tires will merely necessitate the threading of the hand nuts 18 on the bolts to different extents.

Figure 2:
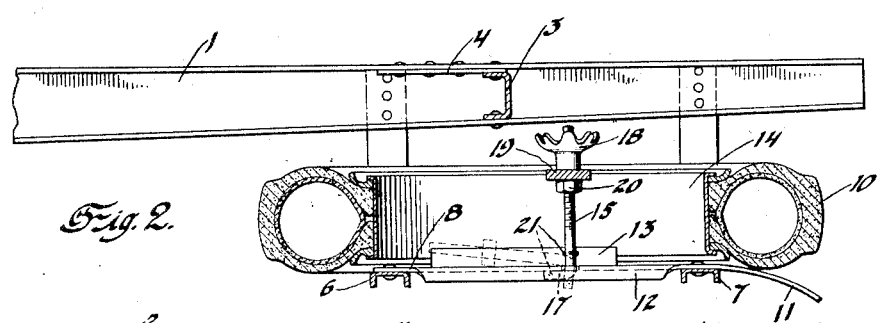
Fig. 2 is a sectional view taken on line 2—2 of Fig. 1.
Figure 3:
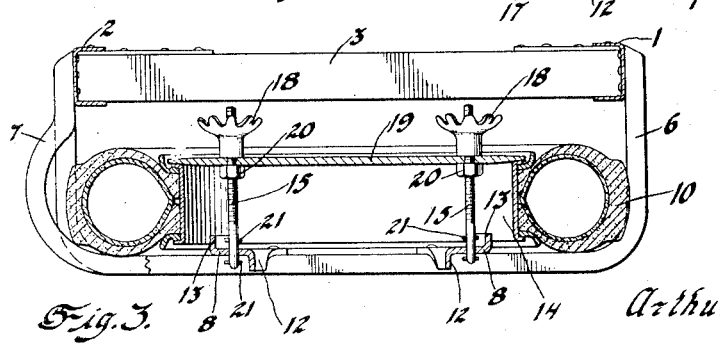
Fig. 3 is a sectional view taken on line 3—3 of Fig. 1.

Because the bolts 15 extending upwardly through the open space within the tire, would offer obstruction to the moving of the tire on or off the platform, these bolts may be swung down out of the space by simply allowing the lower end to turn in the opening in the bar 8 until the foot portion 17 extends through the opening and the shank proper lies in a horizontal plane as is indicated by the dotted lines in Fig. 2. In order that the bolts 15 may not be completely removed from the opening in the bars 8 a pair of pins, such as indicated at 21, may be inserted through each bolt above and below the bar 8 which will then prevent the bolts from accidentally coming out of the openings.

The bar 19 is of such size and shape that it may be readily utilized to advantage as a pry bar to assist in removing and replacing a tire on the platform, and also as a tire tool to pry the casing over the marginal flange at the side of the rim, at such times as when damage to the tire necessitates repair or replacement.

Having thus described my invention, I claim:

1. In a motor vehicle or the like, means to carry a spare tire in a substantially horizontal position beneath the chassis frame of the vehicle, including a load carrying platform suspended from the vehicle, a member hingedly mounted on the platform for swinging movement into and out of the central open space of a tire to be carried, and a combined tire manipulating tool and hold down bar removably held by said member in engagement with the upper side of a tire resting on the platform.

2. In a motor vehicle or the like, means to carry a spare tire in a substantially horizontal position beneath the chassis frame of the vehicle, including a load carrying platform suspended from the vehicle, a pair of studs hingedly mounted on the platform for swinging movement and adapted to project upwardly inside the central open space of a tire rested on the platform and swingable downwardly and out of the way when a tire is being placed on or removed from the platform, a hold down strap removably secured by the studs in engagement with the upper side of the tire, and an adjustable stop on each stud against which the strap can be clamped to prevent rattle of the parts when no spare tire is being carried.

3. In a motor vehicle or the like, means to carry a spare tire in a substantially horizontal position beneath the chassis frame of the vehicle, including a load carrying platform suspended from the vehicle, a hold-down bar engageable with the upper side of the tire, a stud extending thru an aperture in the platform and by which the bar is removably secured in place and having an angular foot engageable with the underside of the platform and slidable thru said aperture to permit the stud to be swung down and out of the way when a tire is being placed on or removed from the platform.

4. In a motor vehicle or the like, means to carry a spare tire in a substantially horizontal position beneath the chassis frame of the vehicle, including a load carrying platform suspended from the vehicle, a hold-down bar engageable with the upper side of the tire, a stud extending thru an aperture in the platform and by which the bar is removably secured in place and having an angular foot engageable with the underside of the platform and slidable thru said aperture to permit the stud to be swung down and out of the way when a tire is being placed on or removed from the platform, and a pair of retainer pins extending thru the pin above and below the platform to prevent its removal from the aperture.

In testimony whereof I affix my signature.

ARTHUR HEBNER.